US006880905B2

(12) United States Patent
Kasahara

(10) Patent No.: US 6,880,905 B2
(45) Date of Patent: Apr. 19, 2005

(54) IMAGE PRINTING APPARATUS AND CONTROL METHOD THEREFOR

(75) Inventor: Takashi Kasahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/410,298

(22) Filed: Apr. 10, 2003

(65) Prior Publication Data

US 2003/0193542 A1 Oct. 16, 2003

(30) Foreign Application Priority Data

Apr. 15, 2002 (JP) ....................................... 2002-112613

(51) Int. Cl.[7] ............................ B41J 29/38; G06K 1/00

(52) U.S. Cl. .......................................... 347/5; 358/1.14

(58) Field of Search .............................. 347/15, 22, 26, 347/29, 32, 37, 48, 56, 61, 5, 23; 358/1.14, 1.17

(56) References Cited

U.S. PATENT DOCUMENTS

| | | | | |
|---|---|---|---|---|
| 4,313,124 A | | 1/1982 | Hara | 347/57 |
| 4,345,262 A | | 8/1982 | Shirato et al. | 347/10 |
| 4,459,600 A | | 7/1984 | Sato et al. | 347/47 |
| 4,463,359 A | | 7/1984 | Ayata et al. | 347/56 |
| 4,558,333 A | | 12/1985 | Sugitani et al. | 347/65 |
| 4,723,129 A | | 2/1988 | Endo et al. | 347/56 |
| 4,740,796 A | | 4/1988 | Endo et al. | 347/56 |
| 5,550,954 A | | 8/1996 | Campbell et al. | 358/1.6 |
| 5,583,547 A | * | 12/1996 | Gast et al. | 347/22 |
| 5,610,638 A | | 3/1997 | Courtney | 347/14 |
| 5,825,993 A | | 10/1998 | Shimura et al. | 358/1.16 |
| 5,920,681 A | | 7/1999 | Hori | 358/1.5 |
| 5,923,820 A | | 7/1999 | Cunnagin et al. | 358/1.8 |
| 6,097,499 A | | 8/2000 | Casey et al. | 358/1.16 |
| 6,247,786 B1 | | 6/2001 | Booth et al. | 347/40 |
| 6,290,325 B1 | * | 9/2001 | Minowa et al. | 347/35 |
| 6,313,922 B1 | | 11/2001 | Jackson | 358/1.16 |
| 6,511,146 B1 | * | 1/2003 | Ishikawa et al. | 347/15 |
| 6,612,674 B1 | | 9/2003 | Holtzman et al. | 347/14 |

FOREIGN PATENT DOCUMENTS

| | | | | |
|---|---|---|---|---|
| EP | 1 120 253 | | 8/2001 | B41J/2/01 |
| JP | 58195357 A | * | 11/1983 | H04N/1/04 |
| JP | 59-123670 | | 7/1984 | |
| JP | 59-138461 | | 8/1984 | |
| JP | 11-259248 | | 9/1999 | |

* cited by examiner

*Primary Examiner*—Hai Pham
(74) *Attorney, Agent, or Firm*—Fitzpatrick, Cella, Harper & Scinto

(57) ABSTRACT

In an image printing apparatus according to this invention, if a block management unit detects that reception of a data frame transferred from a host computer has been delayed during image printing using data frames of divided image data transferred from the host computer, a printing head is moved to the home position at a speed including a speed higher than the image printing speed at the end of image printing using a data frame stored in the block of a RAM. The printing head stands by, and upon the completion of receiving the delayed data frame, is moved from the home position to the position where image printing is interrupted at a speed including a speed higher than the image printing speed. Even if reception of a data frame has been delayed during image printing, the prolongation of the image printing time can be minimized.

10 Claims, 11 Drawing Sheets

1st pass

IMAGE PRINTING APPARATUS AND CONTROL METHOD THEREFOR

FIELD OF THE INVENTION

The present invention relates to a serial image printing apparatus having insufficient memory area for one scanning of a recording head, and a control method therefor.

BACKGROUND OF THE INVENTION

Recently, for print images, the resolution in dots per inch (dpi) of printing apparatuses, such as a printer which prints digital images, is increasing along with the spread of personal computers, digital cameras, and the like. Of printing apparatuses, ink-jet printing apparatuses using an ink-jet printing head have rapidly become popular. Demands has arisen for lower-cost ink-jet printing apparatuses which realize high-resolution images.

A serial scanning ink-jet printing apparatus prints an image of one scanning by the printing head width while scanning the printing head in a direction (main scanning direction) perpendicular to the convey direction (sub-scanning direction) of a printing medium such as a printing sheet. At the end of printing by one scanning, the ink-jet printing apparatus conveys the printing medium in the convey direction. The ink-jet printing apparatus sequentially repeats the image printing operation by one scanning described above, forming a desired image on the printing medium.

In a conventional printing apparatus, data sent from a host computer are data sequential in the main scanning direction (to be referred to as raster data hereinafter). To print an image of one scanning by the printing head width, data must be converted into data sequential in the sub-scanning direction (to be referred to as column data hereinafter) in accordance with the number of print elements (e.g., the number of ink discharge nozzles) of the printing head. To print an image of one scanning, the printing apparatus must hold at least a memory area for accumulating raster data by the number of discharge nozzles and a memory area for accumulating column data.

A higher image quality is required by increasing the dpi (e.g., recording resolution) of the printing apparatus. A higher dpi of the printing apparatus increases the image resolution, resulting in a large data amount for image printing. The memory area necessary for the printing apparatus also increases, and an expensive large-capacity memory leads to high cost, inhibiting cost reduction of the printing apparatus.

A technique of reducing the memory area necessary for the printing apparatus is disclosed in Japanese Patent Laid-Open No. 11-259248. According to Japanese Patent Laid-Open No. 11-259248, isochronous data transfer is performed between a host computer and a printer by minimum buffering. This can reduce the memory capacity necessary for the printing apparatus.

More specifically, image data necessary to print an image of one scanning by a width corresponding to the number of print elements of the printing head is divided into a plurality of data frames and transferred in isochronous data transfer between the host computer and the printer. When the printer receives image data transferred from the host computer, the printer processes the image data and temporarily holds it in the memory area of the printer. This memory area stores one or more data frames of image data during the printing operation by one scanning.

In isochronous data transfer in which image data of one scanning is divided into data frames and transferred, data frames of image data of one scanning are successively transmitted to the memory area of the printer. The memory area size of the printer suffices to ensure at least a memory area capable of storing one or more data frames, and the memory area need not store image data of one scanning. Unlike a conventional printer, a memory area for storing image data of one scanning is not required.

In the above-described isochronous data transfer, the printing operation by one scanning can start upon reception of minimum data necessary for image printing without storing image data of one scanning in the memory area of the printing apparatus. Sequentially transmitted data frames are stored in the memory area of the printer while the memory area is rewritten. An image of one scanning can be formed without interrupting scanning of the printing head, while the memory capacity necessary for the printing apparatus can be reduced.

A serial printing apparatus having no memory area for one scanning of a carriage starts the printing operation upon reception of data of a given amount (e.g., one or more data frames). A memory area which stores printed data is freed, and data newly received from a host computer is stored in the freed area.

An example of the memory area of the serial printing apparatus and reception data in the memory area is shown in FIGS. 3A and 3B. The memory area of the serial printing apparatus comprises 0000H to FFFFH, as shown in FIG. 3A. The memory area is divided into two memory areas: a memory area ($b_0$) of 0000H to 7FFFH and a memory area ($b_1$) of 8000H to FFFFH, as shown in FIG. 3A. As shown in FIG. 3A, the respective memory areas are alternately used to receive and store data frames transmitted from the host computer.

The two memory areas are expressed as blocks ($b_0$ and $b_1$), $b_0$-1th represents that the first data is received and stored in the memory area $b_0$, and $b_1$-1th represents that the first data is received and stored in the memory area $b_1$. Similarly, $b_0$-2th represents that the second data is received in the memory area $b_0$ and the memory content is rewritten, and $b_1$-2th represents that the second data is received in the memory area $b_1$ and the memory content is rewritten.

FIG. 3B shows data frames (reception data) $b_0$-1th, $b_1$-1th, $b_0$-2th, $b_1$-2th, $b_0$-3th, . . . which are alternately accumulated in the two memory areas described above, and an image printed on a printing medium on the basis of these data frames (reception data).

The above printer does not have any memory area for one scanning of a carriage. The printer starts printing (print) operation upon reception of data by either of the blocks. If the other block has received data at the end of printing operation of one block, printing continues. This printing method will be explained in detail with reference to FIGS. 3C and 3D.

FIG. 3C shows the following printing operation. More specifically, the first data (data frame) ($b_0$-1th) is received from a host computer and stored in one memory area ($b_0$) out of the two memory areas (blocks $b_0$ and $b_1$) shown in 1 of FIG. 3C (2 of FIG. 3C). Upon the completion of storage in block $b_0$ (3 of FIG. 3C), the second data (data frame) ($b_1$-1th) transmitted from the host computer is received and stored in block $b_1$ as the other memory area. At the same time, image printing using the first data ($b_0$-1th) starts (reception data decreases) (4 of FIG. 3). After the second data ($b_1$-1th) is stored in $b_1$ (5 of FIG. 3C), printing using the first data ($b_0$-1th) ends (6 of FIG. 3C)

In addition, 7 to 12 of FIG. 3D illustrate the following printing operation subsequent to 6 of FIG. 3C. More specifically, image printing using the second data ($b_1$-1th) starts, and the third data (data frame) ($b_0$-2th) is received and stored in memory area $b_0$ (7 of FIG. 3D). After the third data ($b_0$-2th) is stored (8 of FIG. 3D), printing using the second data ($b_1$-1th) ends (9 of FIG. 3D). Image printing using the third data ($b_0$-2th) starts, and the fourth data (data frame) ($b_1$-2th) is received and stored in memory area $b_1$ (10 of FIG. 3D). After the fourth data ($b_1$-2th) is stored (11 of FIG. 3D), printing using the third data ($b_0$-2th) ends (12 of FIG. 3D).

As described above, the serial printing apparatus having no memory area for one scanning of a carriage starts printing (print) operation upon reception of data of a given amount (e.g., one or more data frames). A memory area which stores printed data is freed, and data newly received from the host is stored in the freed area. The memory area can be reduced on this premise.

The above-described isochronous data transfer suffers the following problem. That is, a job and task in the host computer cannot be managed by the printing apparatus. Isochronous data transfer from the host computer to the printing apparatus may be left undone due to any reason.

For example, if the above-mentioned data transfer from the host computer to the printing apparatus is left undone (data transfer is not in time for image printing) after the start of the printing operation by one scanning, the printing apparatus cannot print any image by the printing head. In this case, the printing head returns to, e.g., the home position (reference position) and waits until image data is stored in the memory area. After a sufficient amount of image data is stored in the memory area, the printing head is scanned again. The printing head returns from the home position (reference position) to the position where image printing is interrupted. Printing then restarts to complete image printing by one scanning.

Every time data transfer from the host computer is left undone, printing operation is interrupted. The printing head returns to the home position, and returns to the interrupted position in order to restart image printing, decreasing the throughput of the printing apparatus.

SUMMARY OF THE INVENTION

The present invention has been made to overcome the conventional drawbacks, and has as its object to provide an image printing apparatus and control method therefor which can suppress the prolongation of the image printing time even if data transfer is left undone during image printing in printing an image using data transferred from a host computer.

To achieve the above object, an image printing apparatus according to an aspect of the present invention has the following arrangement. That is, an image printing apparatus which prints an image while scanning a carriage holding a printing head on a printing medium in a main scanning direction at a predetermined speed comprises detection means for detecting interruption of image printing during the image printing by one scanning, and control means for, when the interruption is detected, controlling to cause the carriage to stand by at a position returned by a predetermined distance from an interruption position toward a printing start position, and when a cause of the interruption is eliminated, controlling to move the carriage from the position returned by the predetermined distance to the interruption position and start the image printing, wherein the control means moves the carriage at a speed higher than the predetermined speed in at least movement of the carriage from the interruption position to the position returned by the predetermined distance and at least part of movement of the carriage from the position returned by the predetermined distance to the interruption position.

For example, the image printing apparatus prints an image while scanning the carriage holding the printing head on a printing medium at the predetermined speed on the basis of image data received from a host apparatus for each of data frames obtained by dividing, by an arbitrary division count, image data necessary to print an image by one scanning at a width corresponding to the number of print elements of the printing head, the image printing apparatus further comprises storage means, divided into a plurality of predetermined areas, for storing the data frames, the detection means detects that storage of a data frame to be printed next is not completed after the start of image printing, and when storage is detected not to be completed, the control means moves the carriage at the speed higher than the predetermined speed in at least movement of the carriage from the interruption position to the position returned by the predetermined distance and at least part of movement of the carriage from the position returned by the predetermined distance to the interruption position.

For example, the position returned by the predetermined distance preferably includes a home position (reference position).

For example, it is preferable that the storage means has at least two areas, and when a data frame is stored in one area, the control means controls to store a next transmitted data frame in the other area and execute image printing using the data frame stored in one area, when data is stored in the other area and image printing using the data frame stored in the other area ends, controls to continue the image printing using the data frame stored in the other area, and controls to continuously execute the image printing by alternately using the two areas.

For example, a data amount stored in the area is preferably smaller than an image data amount of one scanning that is received from the host apparatus.

For example, the printing head preferably includes an ink-jet printing head which discharges ink to perform printing.

For example, the printing head preferably includes a printing head which discharges ink by using heat energy, and has an electrothermal transducer which generates heat energy to be applied to the ink.

To achieve the above object, an image printing apparatus control method according to another aspect of the present invention has the following steps. That is, a method of controlling an image printing apparatus which prints an image while scanning a carriage holding a printing head on a printing medium in a main scanning direction at a predetermined speed comprises a detection step of detecting interruption of image printing during the image printing by one scanning, and a control step of, when the interruption is detected, controlling to cause the carriage to stand by at a position returned by a predetermined distance from an interruption position toward a printing start position, and when a cause of the interruption is eliminated, controlling to move the carriage from the position returned by the predetermined distance to the interruption position and start the image printing, wherein in the control step, the carriage is moved at a speed higher than the predetermined speed in at least movement of the carriage from the interruption position to the position returned by the predetermined distance and at least part of movement of the carriage from the position returned by the predetermined distance to the interruption position.

To achieve the above object, a control program of controlling an image printing apparatus according to still another aspect of the present invention has the following program codes. That is, a control program of controlling an image printing apparatus which prints an image while scanning a carriage holding a printing head on a printing medium in a main scanning direction at a predetermined speed comprises a program code for a detection step of detecting interruption of image printing during the image printing by one scanning, and a program code for a control step of, when the interruption is detected, controlling to cause the carriage to stand by at a position returned by a predetermined distance from an interruption position toward a printing start position, and when a cause of the interruption is eliminated, controlling to move the carriage from the position returned by the predetermined distance to the interruption position and start the image printing, wherein in the control step, the carriage is moved at a speed higher than the predetermined speed in at least movement of the carriage from the interruption position to the position returned by the predetermined distance and at least part of movement of the carriage from the position returned by the predetermined distance to the interruption position.

To achieve the above object, a computer-readable storage medium which stores a control program of controlling an image printing apparatus according to still another aspect of the present invention has the following program codes. That is, a computer-readable storage medium stores a control program of controlling an image printing apparatus which prints an image while scanning a carriage holding a printing head on a printing medium in a main scanning direction at a predetermined speed, the control program comprising a program code for a detection step of detecting interruption of image printing during the image printing by one scanning, and a program code for a control step of, when the interruption is detected, controlling to cause the carriage to stand by at a position returned by a predetermined distance from an interruption position toward a printing start position, and when a cause of the interruption is eliminated, controlling to move the carriage from the position returned by the predetermined distance to the interruption position and start the image printing, wherein in the control step, the carriage is moved at a speed higher than the predetermined speed in at least movement of the carriage from the interruption position to the position returned by the predetermined distance and at least part of movement of the carriage from the position returned by the predetermined distance to the interruption position.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

The following embodiment will exemplify an ink-jet printer using an ink-jet printing method as an image printing apparatus, and a host computer as a host apparatus which transmits image printing data to the image printing apparatus. However, the spirit and scope of the present invention are not limited to the following examples.

In this specification, "printing" (to be also referred to as "print") means to form an image, design, pattern, or the like on a printing medium or to process a medium regardless of whether to form significant information such as a character or figure, whether information is significant or insignificant, or whether information is so visualized as to allow a user to visually perceive it.

"Printing media" are not only paper used in a general printing apparatus, but also ink-receivable materials such as cloth, plastic film, metal plates, glass, ceramics, wood, and leather.

"Ink" (to be also referred to as "liquid") should be interpreted as broadly as the definition of "printing (drawing)". "Ink" represents a liquid which is applied to a printing medium to form an image, design, pattern, or the like, process the printing medium, or contribute to ink processing (e.g., solidification or insolubilization of a coloring material in ink applied to a printing medium).

Figure 6:
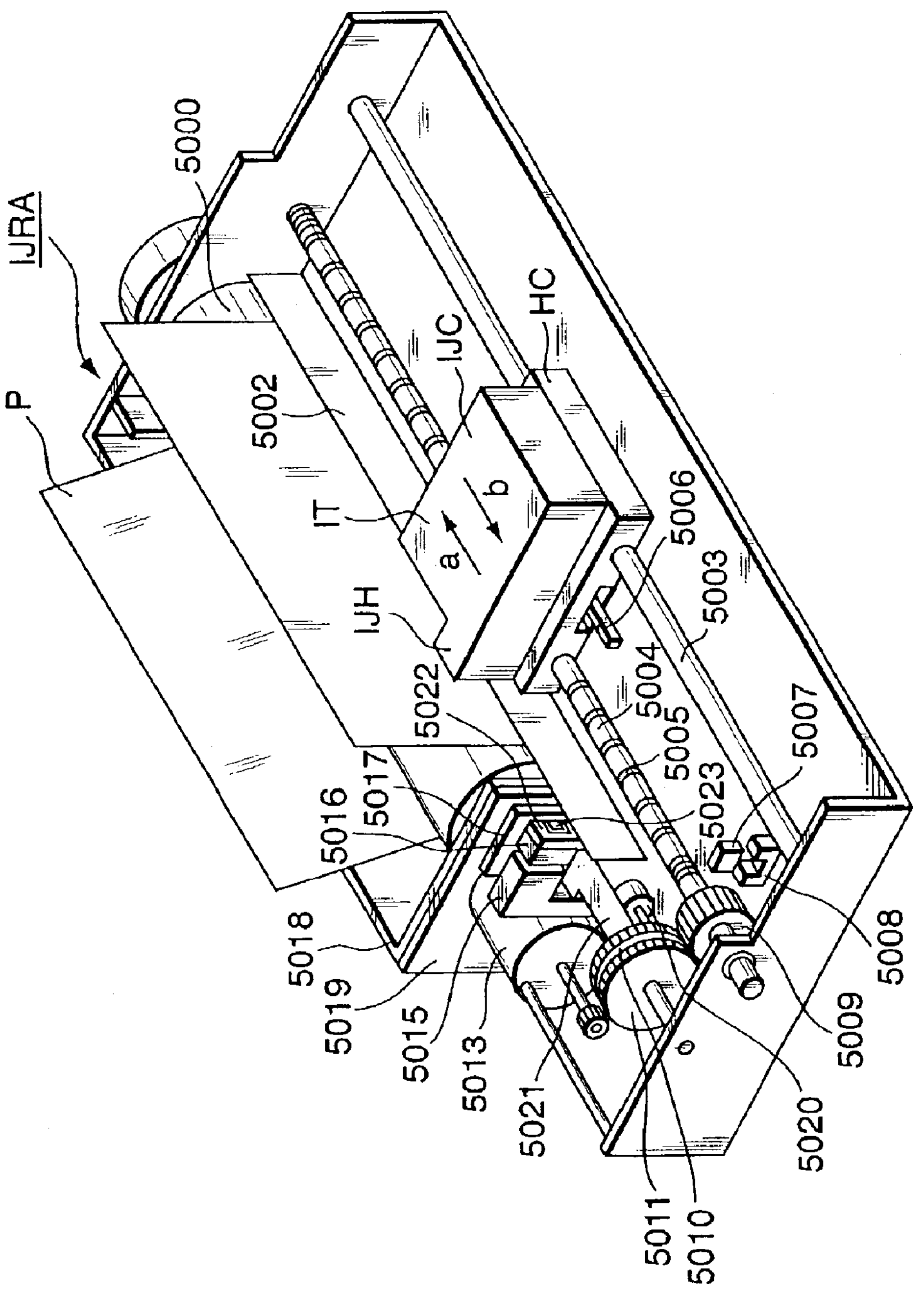
FIG. 6 is a perspective view showing the control arrangement of the ink-jet printer according to the embodiment of the present invention.

<Brief Description of a Printing Apparatus: FIG. 6>

FIG. 6 is a perspective view showing the outer appearance of an ink-jet printer IJRA as a typical embodiment of the present invention. Referring to FIG. 6, a carriage HC engages with a spiral groove 5005 of a lead screw 5004, which rotates via driving force transmission gears 5009 to 5011 upon forward/reverse rotation of a drive motor 5013. The carriage HC has a pin (not shown), and is reciprocally moved in directions of arrows a and b in FIG. 6. An integrated ink-jet cartridge IJC which incorporates a printing head IJH and an ink tank IT is mounted on the carriage HC.

Reference numeral 5002 denotes a sheet pressing plate, which presses a paper sheet against a platen 5000, ranging from one end to the other end of the scanning path of the carriage. Reference numerals 5007 and 5008 denote photo-couplers which serve as a home position detector for recognizing the presence of a lever 5006 of the carriage in a corresponding region, and used for switching, e.g., the rotating direction of motor 5013.

Reference numeral 5016 denotes a member for supporting a cap member 5022, which caps the front surface of the printing head IJH; and 5015, a suction device for sucking ink residue through the interior of the cap member. The suction device 5015 performs suction recovery of the printing head via an opening 5023 of the cap member 5015. Reference numeral 5017 denotes a cleaning blade; and 5019, a member which allows the blade to be movable in the back-and-forth direction of the blade. These members are supported on a main unit support plate 5018. The shape of the blade is not limited to this, and any known cleaning blade can be used in this embodiment.

Reference numeral 5021 denotes a lever for initiating a suction operation in the suction recovery operation. The lever 5021 moves upon movement of a cam 5020, which engages with the carriage, and receives a driving force from the driving motor via a known transmission mechanism such as clutch switching.

The capping, cleaning, and suction recovery operations are performed at their corresponding positions upon operation of the lead screw 5004 when the carriage reaches the home-position side region. However, the present invention is not limited to this arrangement as long as desired operations are performed at known timings.

Figure 7:
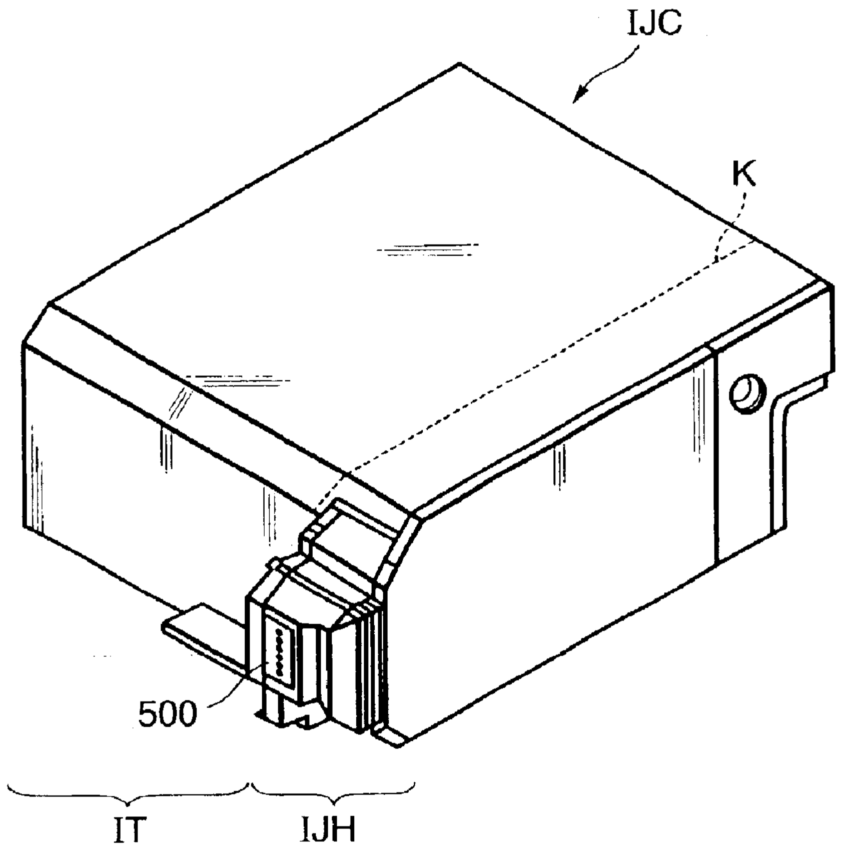
FIG. 7 is a perspective view showing the outer appearance of an ink cartridge.

<Ink Cartridge: FIG. 7>

Note that the ink tank IT and the printing head IJH are integrally formed to construct an exchangeable ink cartridge IJC; however, the ink tank IT and the printing head IJH may be separately formed such that when ink is exhausted, only the ink tank IT need be exchanged for a new ink tank.

FIG. 7 is a perspective view showing the structure of the ink cartridge IJC where the ink tank and the head can be separated. As shown in FIG. 7 in the ink cartridge IJC, the ink tank IT and the printing head IJH can be separated along a line K. The ink cartridge IJC has an electrode (not shown) for receiving an electric signal supplied from the carriage HC side when it is mounted on the carriage HC. By the electric signal, the printing head IJH is driven as above, and discharges ink.

Note that in FIG. 7, numeral 500 denotes an ink-discharge orifice array. Further, the ink tank IT has a fiber or porous ink absorbing body. The ink is held by the ink absorbing body.

Figure 1:
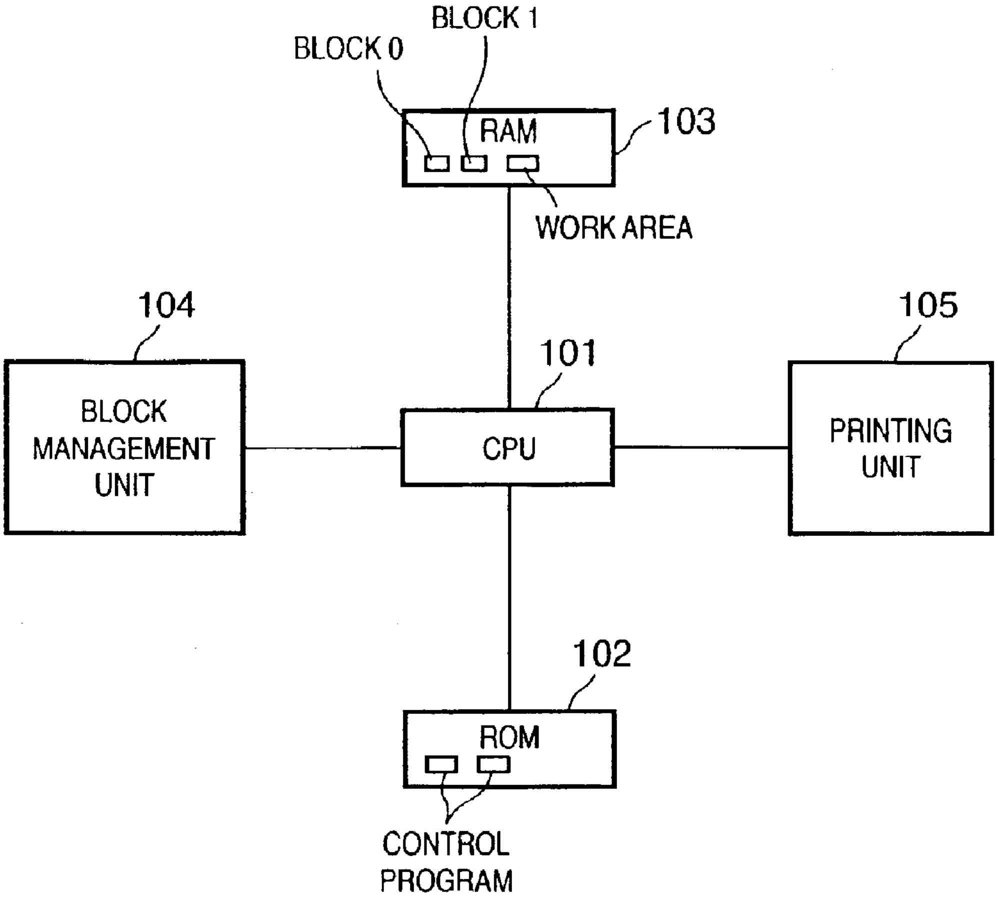
FIG. 1 is a block diagram showing a basic control arrangement according to the present invention.

<Basic Control Arrangement for High-Speed Image Printing: FIG. 1>

A basic control arrangement which realizes high-speed image printing when image data of one scanning is divided into a plurality of data frames and reception of data frames of transferred image data has been delayed in isochronous data transfer from the host computer to the printing apparatus will be explained.

FIG. 1 is a block diagram showing a basic control arrangement for high-speed image printing according to the embodiment. Reference numeral 101 denotes a CPU which controls the operation; 102, a ROM which stores a control program describing operation procedures; 103, a RAM which temporarily stores data such as reception data and provides a work area for a control program; 104, a block management unit which divides the printing region of a printing head into a plurality of regions in the scanning direction, stores print data corresponding to the respective regions in a plurality of divided memory areas (to be referred to as blocks hereinafter), and manages reception in the blocks; and 105, a printing unit.

Figure 2:
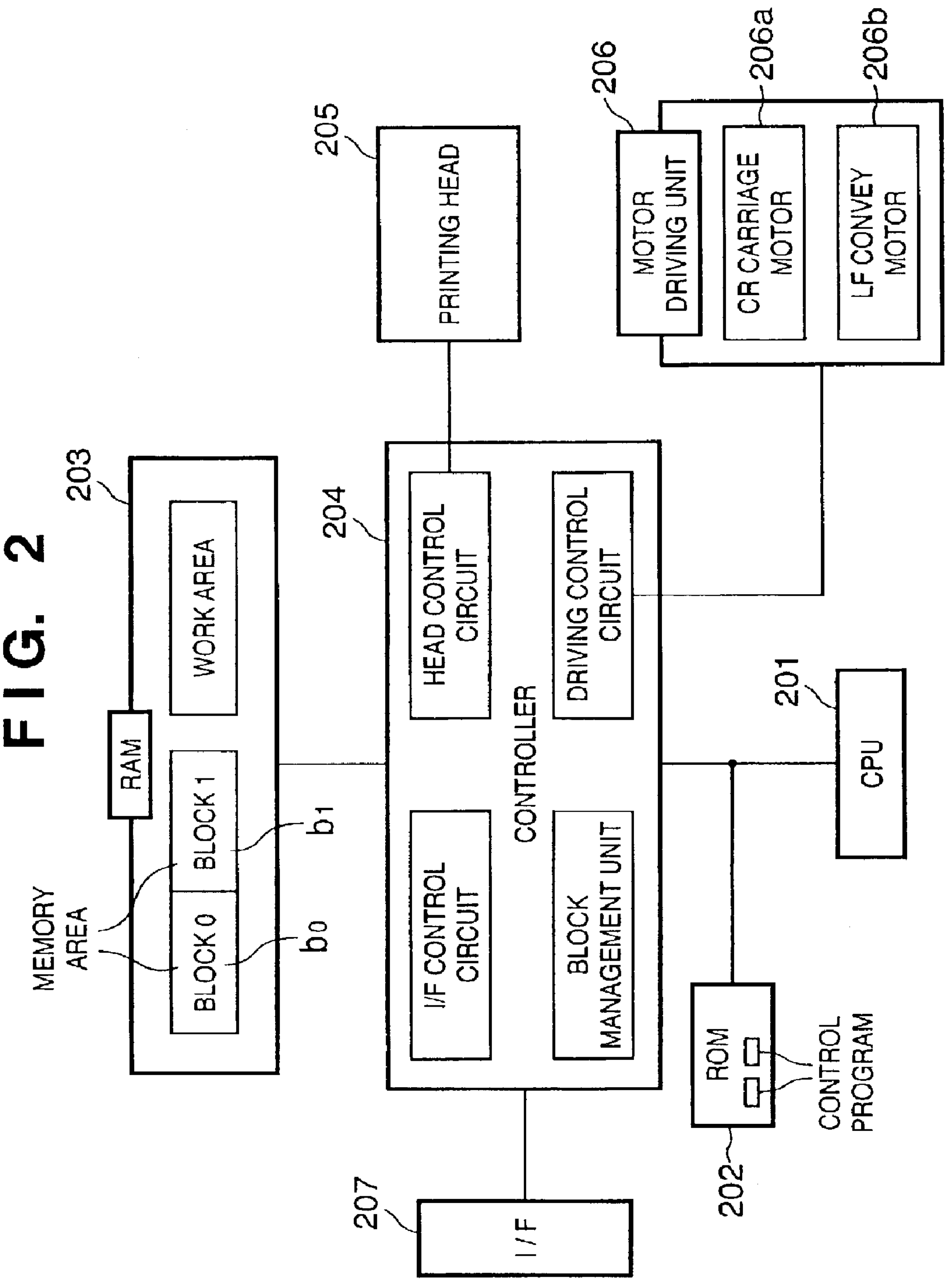
FIG. 2 is a block diagram showing a control arrangement of an ink-jet printer according to the present invention.

<Control Arrangement of Ink-Jet Printer: FIG. 2>

FIG. 2 is a block diagram showing a control arrangement of the whole ink-jet printer.

In FIG. 2, reference numeral 201 denotes a CPU which controls the operation of the overall ink-jet printer. The CPU 201 is connected to a ROM 202 which stores control programs describing all operations, and a controller 204 which includes means for controlling respective units of the ink-jet printer, such as an I/F control circuit, data control circuit, head control circuit, and driving control circuit.

A RAM 203 has for each block a work area used for jobs by the CPU 201 and a memory area for storing print data. Two memory areas which store reception data received from the host computer are expressed as blocks ($b_0$ and $b_1$).

A block which stores print data is managed by the controller 204. In response to an instruction from the CPU 201, the controller 204 controls to transfer data to the printing head 205, and drive a carriage motor 206*a* for scanning a printing head 205 and an LF motor 206*b* for feeding a printing medium in synchronism with each other. The controller 204 has an I/F circuit 207 which receives print data from the host computer. Received print data is stored in the work area of the RAM 203 under the control of the controller 204. FIG. 1 shows only a control arrangement of executing image printing at a high speed when transfer of image data from the host computer to the ink-jet printer has been delayed in the control arrangement of the ink-jet printer in FIG. 2. The RAM 103, CPU 101, and ROM 102 in FIG. 1 are identical to the RAM 203, CPU 201, and ROM 202 in FIG. 2.

Figure 4A:
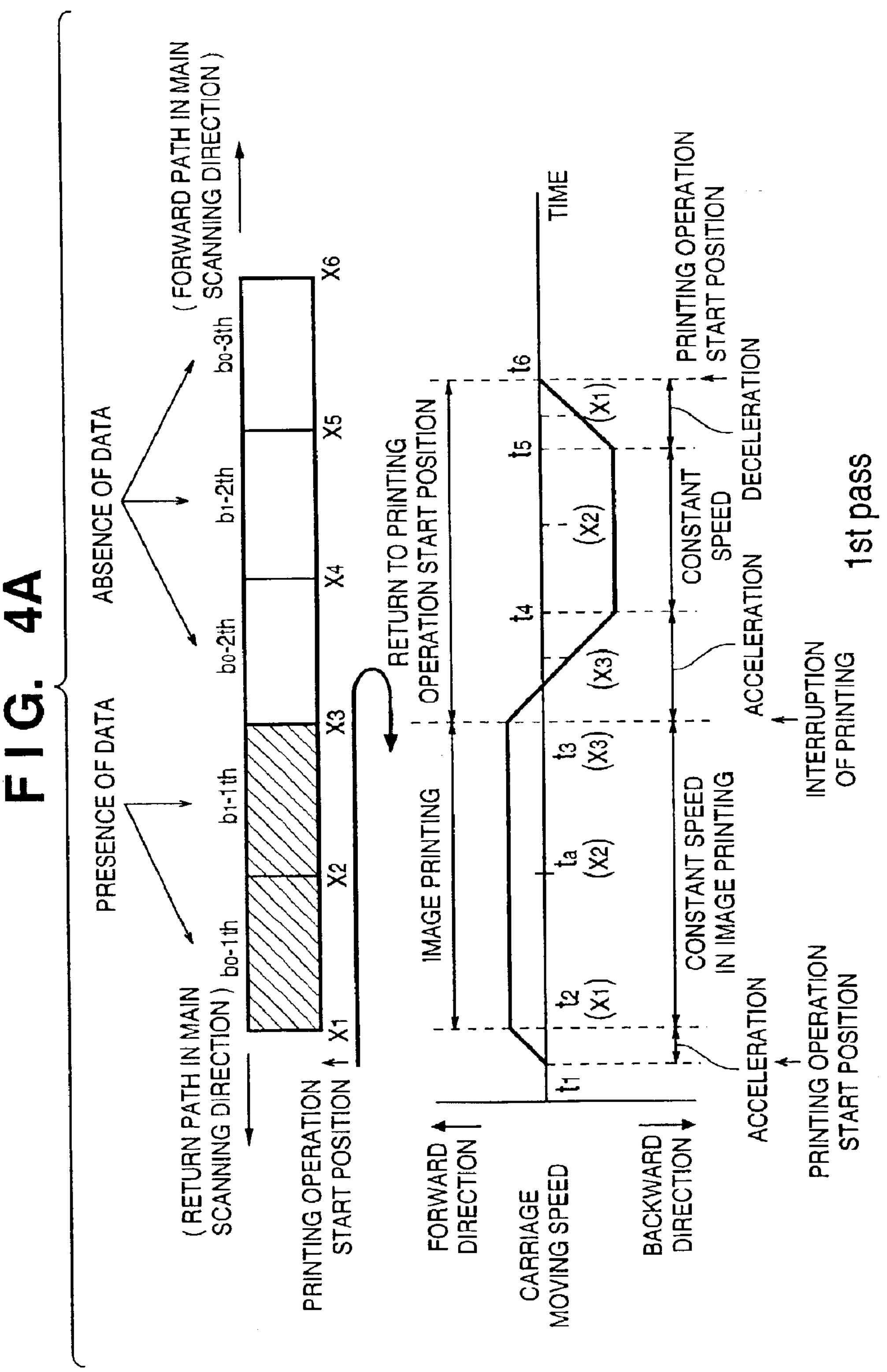
FIG. 4A is a view for explaining control of moving a carriage to a reference position when reception data delays and image printing is interrupted according to an embodiment of the present invention.
Figure 4B:
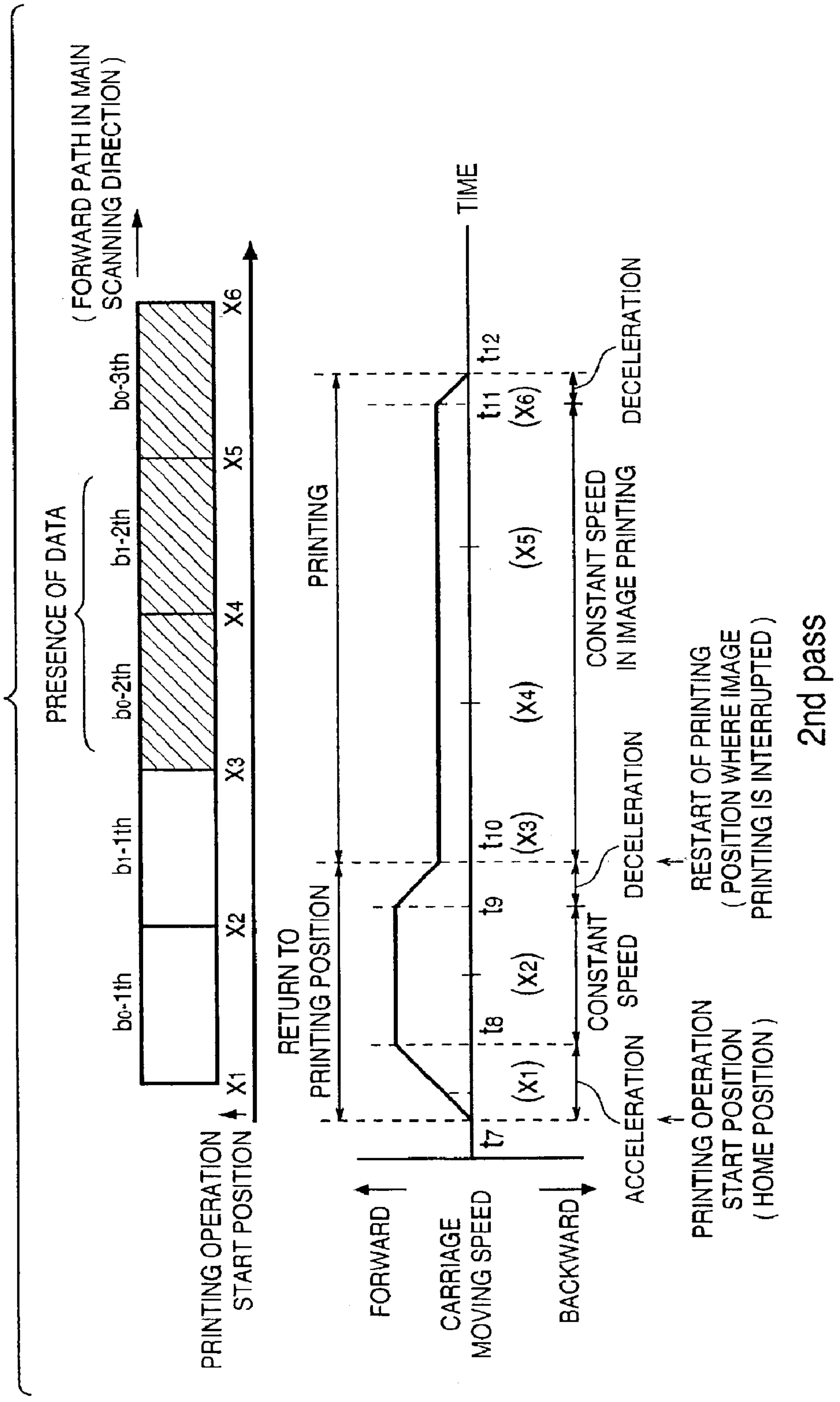
FIG. 4B is a view for explaining control of moving the carriage from the reference position to an interrupted position when interrupted image printing restarts according to the embodiment of the present invention.

<High-Speed Image Printing When Reception Data is Delayed: FIGS. 4A and 4B>

High-speed image printing when reception of image data transferred from the host computer to the ink-jet printer is delayed will be explained with reference to FIGS. 4A, 4B, 3C, and 3D. FIG. 4A is a view for explaining control of moving a carriage to a reference position when reception data has been delayed and image printing is interrupted according to an embodiment of the present invention. FIG. 4B is a view for explaining control of moving the carriage from the reference position to an interrupted position when interrupted image printing restarts according to the embodiment of the present invention. Each upper figure in FIG. 4A and FIG. 4B shows image printing position ($X_1$–$X_6$), data for image printing and the operation of the carriage and each lower figure in FIG. 4A and FIG. 4B shows time change of carriage moving speed ($t_1$–$t_{11}$) according to an embodiment of the present invention.

FIGS. 4A and 4B show a state in which the operation of the carriage (i.e., the moving speed and moving direction of the carriage) is changed depending on the presence/absence of print data stored in block 0 (to be described as $b_0$) and block 1 (to be described as $b_1$) in the RAM 203.

In FIG. 4A, the first printing operation (to be referred to as "1st pass") will be explained. If the first data (to be referred to as $b_0$-1th) transmitted from the host computer is detected to be stored in the memory area of block $b_0$, carriage operation starts.

After the start of carriage operation, the second data ($b_1$-1th) transmitted from the host computer is received (stored) in the next block $b_1$. If the second data ($b_1$-1th) is stored in block $b_1$ before printing using the first data stored in the preceding block ($b_0$) ends (time ta), printing using the second data ($b_1$-1th) continues subsequently to the first data ($b_0$-1th).

During printing of the second data ($b_1$-1th), the third data ($b_0$-2th) is received (stored) in the next block $b_0$. The third data ($b_0$-2th) is received (stored) in the same block as the block which has received (stored) the first data $b_0$-1th, and printed data has already been cleared.

Printing using the third data ($b_0$-2th) continues subsequently to the second data ($b_1$-1th). An image can be successively printed by repetitively using two blocks $b_0$ and $b_1$.

Figure 3A:
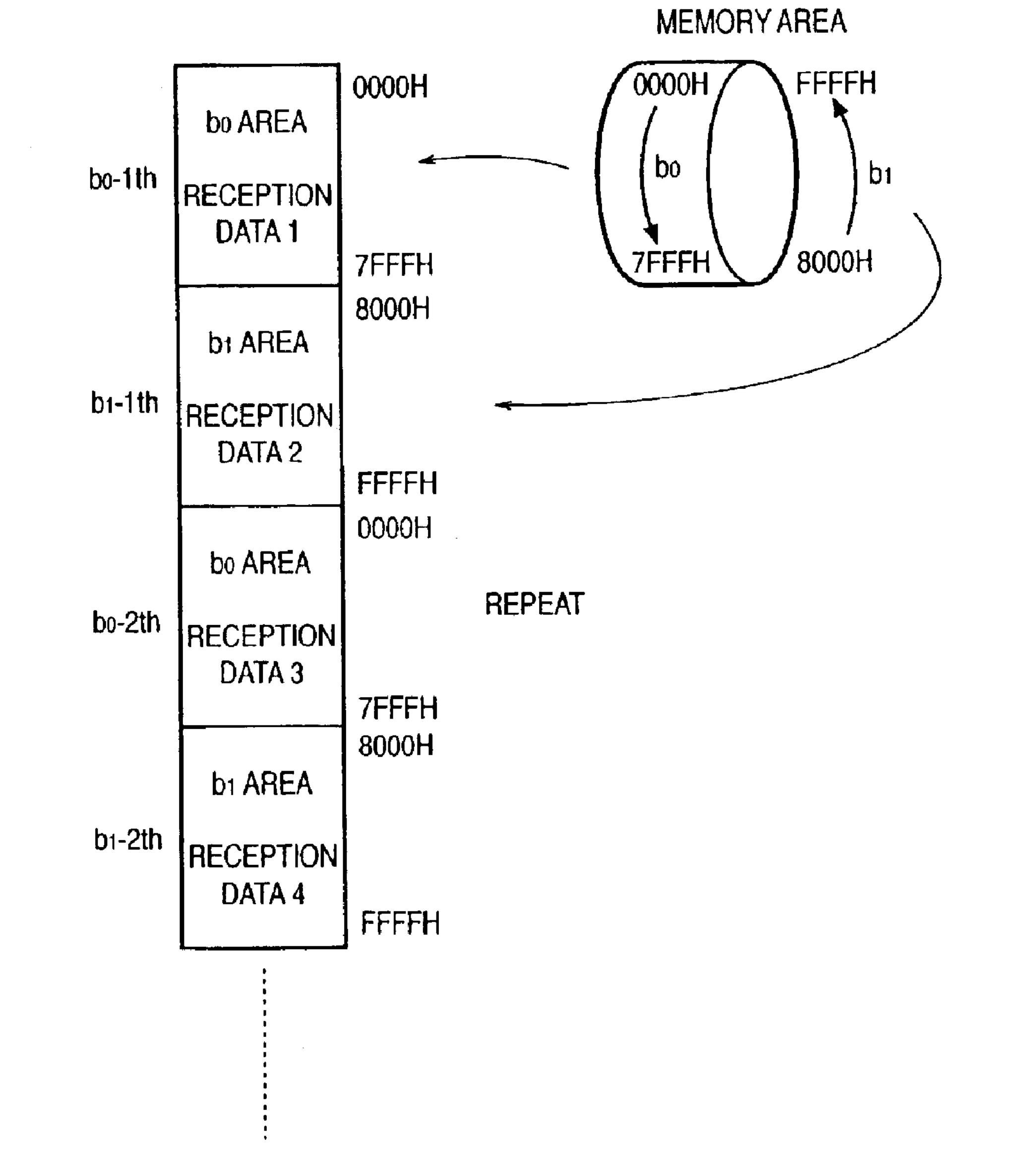
FIG. 3A is a view for explaining a sequence of storing reception data successively transmitted to two memory areas.
Figure 3B:
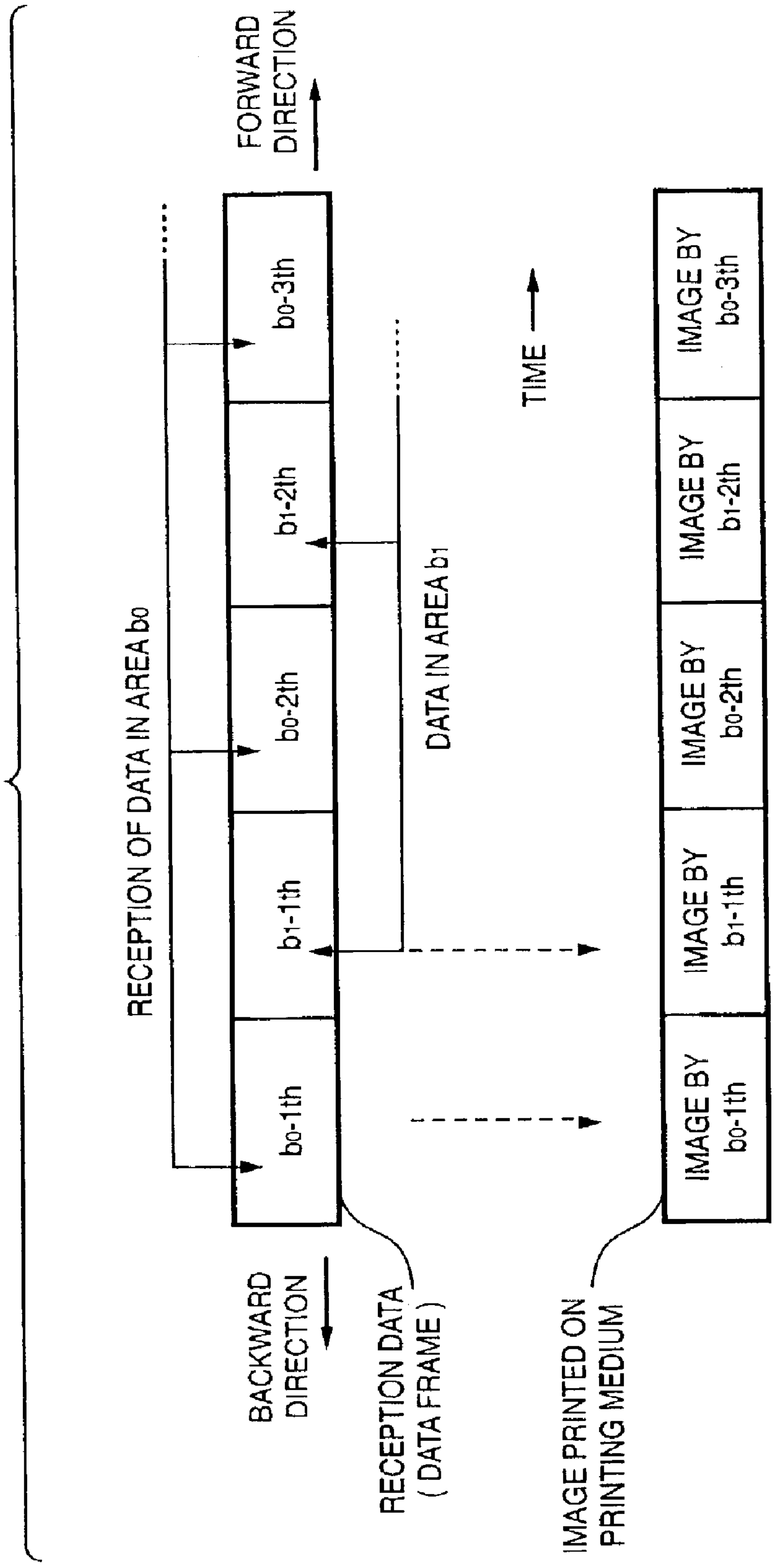
FIG. 3B is a view for explaining the order of reception data stored in the two memory areas.
Figure 3C:
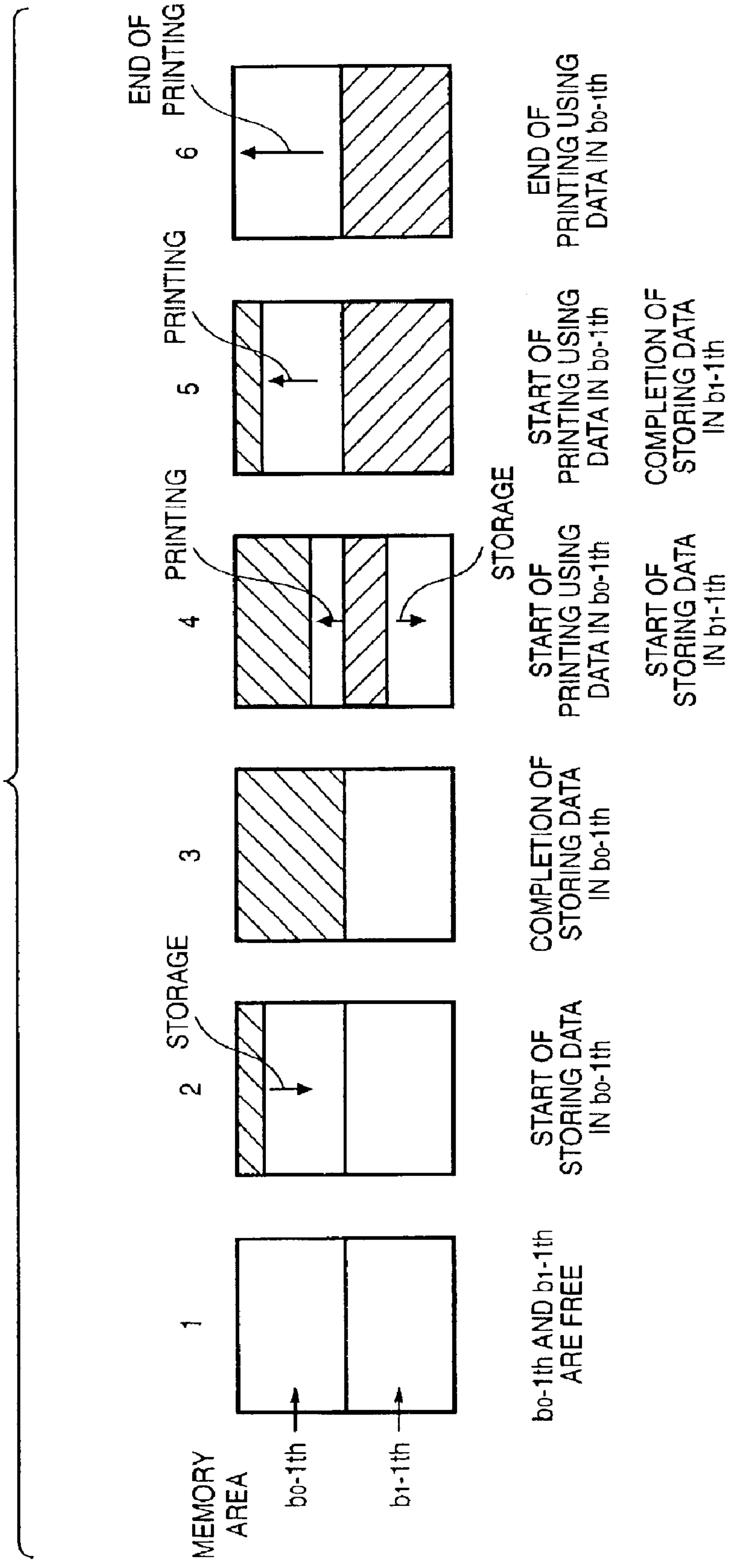
FIG. 3C is a view for explaining reception data stored in the two memory areas and a method of printing an image by using the stored reception data.
Figure 3D:
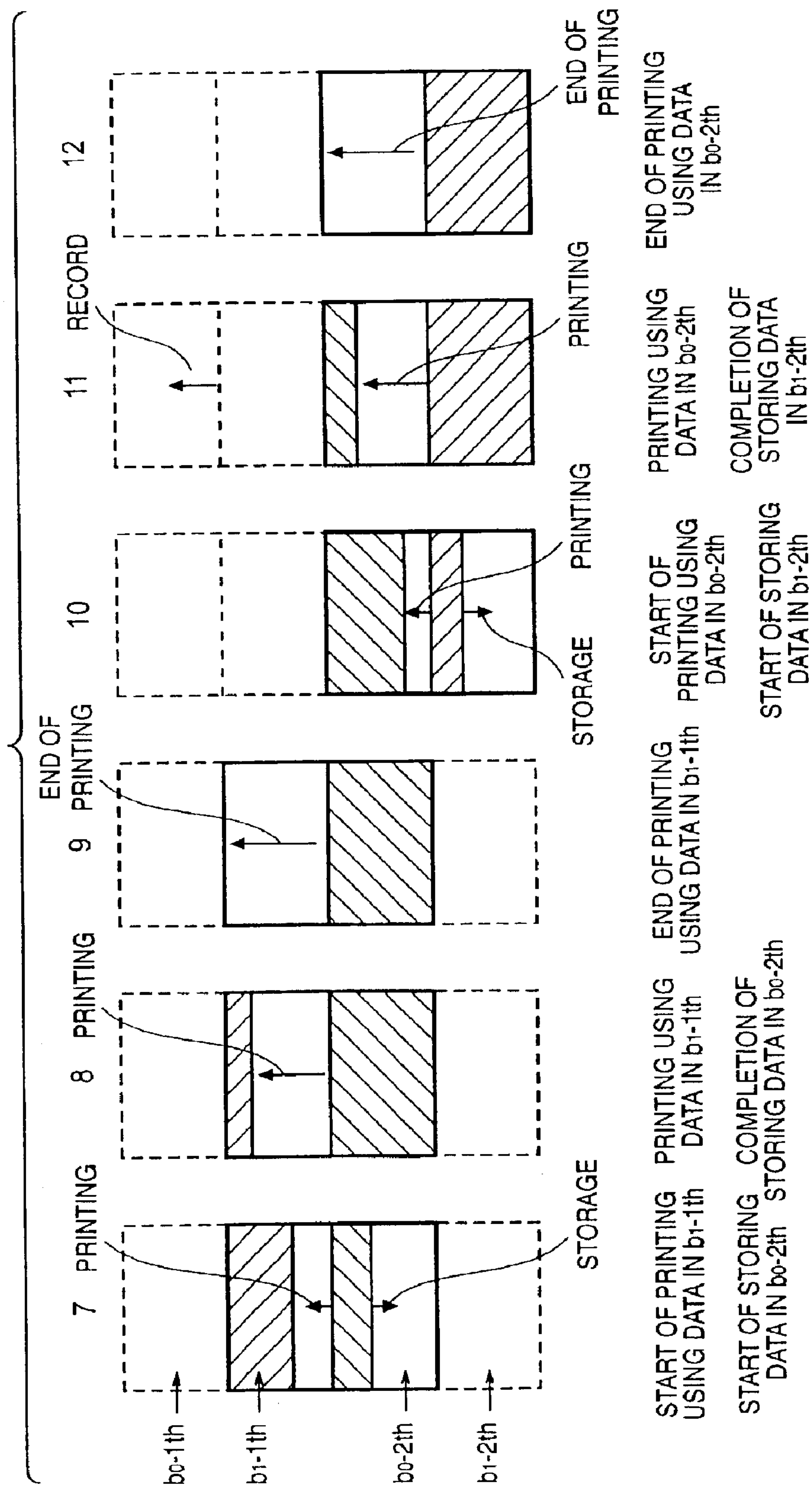
FIG. 3D is a view, subsequent to FIG. 3C, for explaining the reception data stored in the two memory areas and the method of printing an image by using the stored reception data.

Storage in the above-mentioned memory area and printing operation using stored data are the same as those in FIGS. 3C and 3D.

In this manner, even an ink-jet printer having no memory area for one scanning of the carriage can start the printing operation by using stored data without receiving image data of one scanning immediately when data of a given amount (one data frame) is stored in one block (e.g., $b_0$). After the printing operation ends, the memory area which has stored the data is freed. The next data newly transmitted from the host computer is stored in the freed area.

The memory area can be reduced in the ink-jet printer which assumes that the above-described processing is continuously performed.

For example, when image printing using the third data ($b_0$-2th) is to be done subsequently to the second data ($b_1$-1th), the third data ($b_0$-2th) cannot be printed unless the third data ($b_0$-2th) is completely stored in block $b_0$. In this case, printing is interrupted at the end of printing of block $b_1$-1th (time $t_3$ in FIG. 4A). Therefore, in FIG. 4A, data of block $b_0$-1th and block $b_1$-1th are printed in the period of $t_2$ to $t_3$ but data of $b_0$-2th subsequently is not printed and the printing is interrupted.

In this way, if data transfer from the host computer to the ink-jet printer is left undone and printing is interrupted after the start of printing operation by one scanning, the printing head is moved from a position where image printing is interrupted to the home position (reference position) at the same moving speed as the image printing speed. The printing head stands by, and after a sufficient amount of image data is stored in the memory area, is moved again from the home position (reference position) to the position where image printing is interrupted at the same moving speed as the image printing speed. This arrangement, however, decreases the image printing throughput.

(Increase in Image Printing Speed)

The ink-jet printer of the embodiment can minimize a decrease in image printing throughput which occurs in the conventional ink-jet printer described above, as shown in FIG. 4A.

More specifically, if data transfer from the host computer to the ink-jet printer is left undone and printing is interrupted, the printing head is moved from a position (position corresponding to $t_3$ in FIG. 4A) where image printing is interrupted to the home position (printing operation start position: position corresponding to $t_6$ in FIG. 4A) at a speed including a moving speed higher than the image printing speed. This can minimize a decrease in image printing throughput.

The printing operation (to be referred to as "2nd pass") which restarts after image printing using the ink-jet printer of the embodiment is interrupted will be explained with reference to FIG. 4B.

FIG. 4B shows that the printing operation restarts when data left undone is transferred from the host computer to the ink-jet printer and reception of the third data ($b_0$-2th) in block $b_0$ where reception has not been completed is completed (time $t_7$).

The ink-jet printer of the embodiment minimizes the above-mentioned decrease in throughput upon the completion of receiving the third data ($b_0$-2th) For this purpose, the printing head is moved at a speed including a moving speed which is higher than a moving speed used for image printing and is used to return the printing head from the home position (printing operation start position: position corresponding to $t_7$ in FIG. 4B) to a position (position corresponding to $t_{10}$ in FIG. 4B) where image printing is interrupted, as shown in FIG. 4B.

As described above, when data transfer from the host computer to the ink-jet printer is delayed, the ink-jet printer of the embodiment can move the printing head from a position where image printing is interrupted to the home position, or from the home position to the position where image printing is interrupted, at a speed including a speed higher than the normal printing speed, as shown in FIGS. 4A and 4B. The ink-jet printer can minimize the conventional decrease in image printing throughput.

Figure 5:
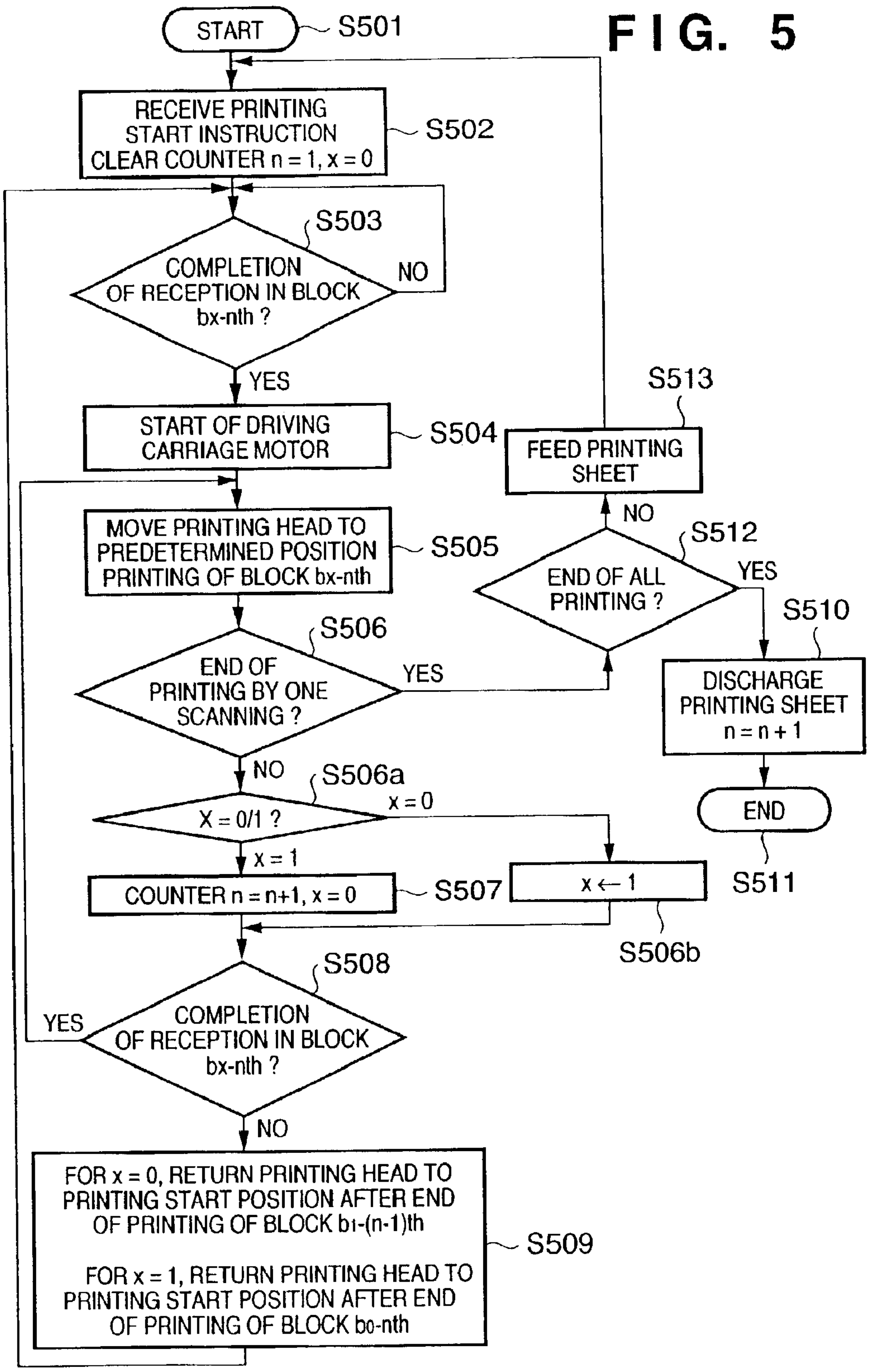
FIG. 5 is a flow chart for explaining processing of controlling the carriage when reception data delays and image printing is interrupted according to the embodiment of the present invention.

<Flow of High-Speed Image Processing: FIG. 5>

Processing when data frame transfer from the host computer to the ink-jet printer is left undone (data frame transfer does not catch up with image printing) will be explained with reference to the flow chart of FIG. 5.

If a printing start instruction is received in step S501, the processing advances to step S502 to clear a counter value n and x for managing blocks in the RAM 103, wherein x is a block identification number representing block 0 ($b_0$) or block 1 ($b_1$) in the RAM 203, and the counter value n represents the use count of each block after the start of printing on a given line.

The processing advances to step S503 to determine whether reception in block $b_x$-nth has been completed. If NO in step S503, the processing waits for the completion of reception. If reception in block $b_x$-nth is completed, the processing advances to step S504.

Note that "x" of block $b_x$-nth is the identification number of a block in the RAM 203. In this embodiment, blocks include two blocks 0 ($b_0$) and 1 ($b_1$), and x takes 0 or 1. A practical value of block $b_x$-nth is, e.g., $b_0$-1th (x=0) for a line (n=1) at the start of the first image printing.

In step S504, the carriage motor 206*a* for scanning the printing head 205 is driven.

The processing advances to step S505, and if the carriage motor 206*a* is driven and the printing head 205 reaches a predetermined position, the printing operation is performed.

The processing advances to step S506, and if printing by one scanning ends in the current block, to step S512 to determine whether all printing has ended. If YES in step S512, the processing advances to step S510 to discharge the printing sheet, and to step S511 to end a series of operations.

If NO in step S512, the processing returns to step S502 to continue the above-described processing.

If NO in step S506, the processing advances to step S506*a* to determine whether x=0 or 1. For x=1, the processing advances to step S507 to set x=0 and increment the counter value n, and then to step S508. For x=0, the processing advances to step S506*b* to set x=1, and then to step S508.

If reception in block $b_x$-nth in step S508 has been completed, the processing returns to step S505 to continue the above-described processing.

If NO in step S508, the processing advances to step S509. The printing head is returned to the home position (reference position) upon the completion of printing in block during printing of $b_1$-(n−1)th for x=0 or the completion of printing in block during printing of $b_0$-nth for x=1. The processing returns to step S503 to continue the above-described processing.

In this embodiment, when the next block has not completely received print data, the printing head is returned to the home position (reference position) as the printing start position of a line, as described above. This position is merely an example, and the printing head may be returned to another position.

The above-described control can suppress a decrease in the image printing throughput of the ink-jet printer upon interruption of the printing operation when the next block has not completely received print data.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called on-demand type and continuous type systems. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal.

By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region, is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a single printing head obtained by forming printing heads integrally can be used.

In addition, not only an exchangeable chip type printing head, as described in the above embodiment, which can be electrically connected to the apparatus main unit and can receive an ink from the apparatus main unit upon being mounted on the apparatus main unit, but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include, for the printing head, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printing head or by combining a plurality of printing heads.

Further, the object of the present invention can also be achieved by providing a storage medium storing program code for performing the aforesaid processes to a computer system or apparatus (e.g., a personal computer), reading the program code, by a CPU or MPU of the computer system or apparatus, from the storage medium, then executing the program. In this case, the program code read from the storage medium realize the functions according to the embodiments, and the storage medium storing the program code constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, additional functions according to the above embodiments are realized by executing the program code which are read by a computer. The present invention includes a case where an OS (operating system) or the like working on the computer performs a part of or an entire process in accordance with designations of the program code and realizes functions according to the above embodiments.

Furthermore, the present invention also includes a case where, after the program code read from the storage medium are written in a function expansion card which is inserted into the computer or in a memory provided in a function expansion unit which is connected to the computer, a CPU or the like contained in the function expansion card or function expansion unit performs a part of or an entire process in accordance with designations of the program code and realizes functions of the above embodiments.

In the case where the present invention is provided in the form of the above storage medium, the storage medium stores program code corresponding to the above-mentioned flow charts (FIG. 5).

As has been described above, the present invention can provide an image printing apparatus and control method therefor which can suppress the prolongation of the image printing time even if data transfer is left undone during image printing in printing an image using data transferred from a host computer.

As many apparently widely different embodiments of the present invention can be made without departing from the spirit and scope thereof, it is to be understood that the invention is not limited to the specific embodiments thereof except as defined in the claims.

What is claimed is:

1. An image printing apparatus which prints an image while scanning a carriage holding a printing head relative to a printing medium in a main scanning direction at a predetermined speed on the basis of image data received from a host apparatus in units of data frames, which are obtained by dividing, into a desired number of data frames, image data necessary to print an image by one scanning at a width corresponding to a number of print elements of the printing head, comprising:

storage means for storing the image data received from the host apparatus, said storage means storing the received image data in a plurality of storage areas, each corresponding to one of the data frames;

printing control means for controlling to start image printing using the image data stored in said storage means before an end of storing image data in a plurality of data frames corresponding to a print area to be printed by one scanning of the printing head, wherein image data further received from the host apparatus is stored in said storage means after the image printing is started by said printing control means;

detection means for detecting interruption of image printing during the image printing by one scanning; and carriage control means for, when the interruption is detected, controlling to cause the carriage to stand by at a position returned by a predetermined distance from an interruption position toward a printing start position, and when a cause of the interruption is eliminated, controlling to move the carriage from the position returned by the predetermined distance to the interruption position and start the image printing, wherein said printing control means interrupts the image printing when image data corresponding to a data frame next to a data frame storing image data in printing is not received, and wherein said carriage control means moves the carriage at a speed higher than the predetermined speed in at least movement of the carriage from the interruption position to the position returned by the predetermined distance and at least part of movement of the carriage from the position returned by the predetermined distance to the interruption position.

2. The apparatus according to claim 1, wherein an image is printed while scanning the carriage holding the printing head relative to the printing medium at the predetermined speed on the basis of the image data received from the host apparatus for each of the data frames obtained by dividing, by an arbitrary division count, the image data necessary to print the image by one scanning at the width corresponding to the number of print elements of the printing head, said detection means detects that storage of a data frame to be printed next is not completed after a start of image printing, and when detected that storage is not completed, said carriage control means moves the carriage at the speed higher than the predetermined speed in at least the movement of the carriage from the interruption position to the position returned by the predetermined distance and at least part of the movement of the carriage from the position returned by the predetermined distance to the interruption position.

3. The apparatus according to claim 2, wherein said storage means has at least two areas, and when a data frame is stored in one area, said printing control means controls to store a next transmitted data frame in the other area and execute image printing using the data frame stored in the one area, and when a data frame is stored in the other area and image printing using the data frame stored in the one area ends, said printing control means controls to continue the image printing using the data frame stored in the other area, and controls to continuously execute the image printing by alternately using the two areas.

4. The apparatus according to claim 2, wherein a data amount stored in each storage area is smaller than an image data amount of one scanning that is received from the host apparatus.

5. The apparatus according to claim 1, wherein the position returned by the predetermined distance includes a home position (reference position).

6. The apparatus according to claim 1, wherein the printing head includes an ink-jet printing head which discharges ink to perform printing.

7. The apparatus according to claim 6, wherein the ink-jet printing head discharges the ink by using heat energy, and comprises electrothermal transducers which generate the heat energy to be applied to the ink.

8. A method of controlling an image printing apparatus which prints an image while scanning a carriage holding a printing head relative to a printing medium in a main scanning direction at a predetermined speed on the basis of image data received from a host apparatus in units of data frames, which are obtained by dividing, into a desired number of data frames, image data necessary to print an image by one scanning at a width corresponding to a number of print elements of the printing head, comprising:

a storage step of storing the image data received from the host apparatus, the storage step storing the received image data in a plurality of storage areas, each corresponding to one of the data frames;

a printing control step of controlling to start image printing using the image data stored in the storage step before an end of storing image data in a plurality of data frames corresponding to a print area to be printed by one scanning of the printing head, wherein image data further received from the host apparatus is stored in the storage step after the image printing is started in the printing control step;

a detection step of detecting interruption of image printing during the image printing by one scanning; and a carriage control step of, when the interruption is detected, controlling to cause the carriage to stand by at a position returned by a predetermined distance from an interruption position toward a printing start position, and when a cause of the interruption is eliminated, controlling to move the carriage from the position returned by the predetermined distance to the interruption position and start the image printing, wherein the printing control step interrupts the image printing when image data corresponding to a data frame next to a data frame storing image data in printing is not received, and wherein in the carriage control step, the carriage is moved at a speed higher than the predetermined speed in at least movement of the carriage from the interruption position to the position returned by the predetermined distance and at least part of movement of the carriage from the position returned by the predetermined distance to the interruption position.

9. A control program of controlling an image printing apparatus which prints an image while scanning a carriage holding a printing head relative to a printing medium in a main scanning direction at a predetermined speed on the basis of image data received from a host apparatus in units of data frames, which are obtained by dividing, into a desired number of data frames, image data necessary to print an image by one scanning at a width corresponding to a number of print elements of the printing head, comprising:

a program code for a storage step of storing the image data received from the host apparatus, the storage step storing the received image data in a plurality of storage areas, each corresponding to one of the data frames;

a program code for a printing control step of controlling to start image printing using the image data stored in the storage step before an end of storing image data in a plurality of data frames corresponding to a print area to be printed by one scanning of the printing head, wherein image data further received from the host apparatus is stored in the storage step after the image printing is started in the printing control step;

a program code for a detection step of detecting interruption of image printing during the image printing by one scanning; and a program code for a carriage control step of, when the interruption is detected, controlling to cause the carriage to stand by at a position returned by a predetermined distance from an interruption position toward a printing start position, and when a cause of the interruption is eliminated, controlling to move the carriage from the position returned by the predetermined distance to the interruption position and start the image printing, wherein the printing control step interrupts the image printing when image data corresponding to a data frame next to a data frame storing image data in printing is not received, and wherein in the carriage control step, the carriage is moved at a speed higher than the predetermined speed in at least movement of the carriage from the interruption position to the position returned by the predetermined distance and at least part of movement of the carriage from the position returned by the predetermined distance to the interruption position.

10. A computer-readable storage medium which stores a control program of controlling an image printing apparatus which prints an image while scanning a carriage holding a printing head relative to a printing medium in a main scanning direction at a predetermined speed on the basis of image data received from a host apparatus in units of data frames, which are obtained by dividing, into a desired number of data frames, image data necessary to print an image by one scanning at a width corresponding to a number of print elements of the printing head, the control program comprising:

a program code for a storage step of storing the image data received from the host apparatus, the storage step storing the received image data in a plurality of storage areas, each corresponding to one of the data frames;

a program code for a printing control step of controlling to start image printing using the image data stored in the storage step before an end of storing image data in a plurality of data frames corresponding to a print area to be printed by one scanning of the printing head, wherein image data further received from the host apparatus is stored in the storage step after the image printing is started in the printing control step;

a program code for a detection step of detecting interruption of image printing during the image printing by one scanning; and a program code for a carriage control step of, when the interruption is detected, controlling to cause the carriage to stand by at a position returned by a predetermined distance from an interruption position toward a printing start position, and when a cause of the interruption is eliminated, controlling to move the carriage from the position returned by the predetermined distance to the interruption position and start the image printing, wherein the printing control step interrupts the image printing when image data corresponding to a data frame next to a data frame storing image data in printing is not received, and wherein in the carriage control step, the carriage is moved at a speed higher than the predetermined speed in at least movement of the carriage from the interruption position to the position returned by the predetermined distance and at least part of movement of the carriage from the position returned by the predetermined distance to the interruption position.

* * * * *

UNITED STATES PATENT AND TRADEMARK OFFICE

CERTIFICATE OF CORRECTION

PATENT NO. : 6,880,905 B2
DATED : April 19, 2005
INVENTOR(S) : Kasahara

It is certified that error appears in the above-identified patent and that said Letters Patent is hereby corrected as shown below:

Title page,
Item [56], References Cited, FOREIGN PATENT DOCUMENTS,
"JP 58195357 A" should read -- JP 58-195357 A --.

Column 2,
Line 67, "FIG 3C)" should read -- FIG. 3C). --.

Column 10,
Line 9, "($b_0$-2th)" should read -- ($b_0$-2th). --.

Signed and Sealed this

Twentieth Day of December, 2005

JON W. DUDAS
*Director of the United States Patent and Trademark Office*